(12) United States Patent
Grach et al.

(10) Patent No.: US 6,286,627 B1
(45) Date of Patent: Sep. 11, 2001

(54) FLUID DISPENSING APPARATUS

(75) Inventors: Ayzik Grach, Chesterfield, MO (US); Christopher D. Holland, Wood River, IL (US)

(73) Assignee: Lincoln Industrial Corporation, St. Louis, MO (US)

( * ) Notice: Subject to any disclaimer, the term of this patent is extended or adjusted under 35 U.S.C. 154(b) by 0 days.

(21) Appl. No.: 09/382,739

(22) Filed: Aug. 25, 1999

(51) Int. Cl.$^7$ ................................................ F16N 27/00
(52) U.S. Cl. ........................... 184/6; 222/262; 251/355; 184/7.4
(58) Field of Search ............................. 184/6, 7.4, 55.1, 184/57; 222/249, 250, 334, 262, 386.5, 389; 137/246; 251/355

(56) References Cited

U.S. PATENT DOCUMENTS

| | | | |
|---|---|---|---|
| 1,995,342 | * 3/1935 | Dirkes ................................. | 222/249 |
| 2,254,274 | * 9/1941 | Doe ..................................... | 222/249 |
| 2,462,642 | * 2/1949 | Jacobson et al. .................... | 222/249 |
| 2,498,407 | * 2/1950 | Fine .................................... | 184/7.4 |
| 2,642,034 | 6/1953 | Griffin et al. . | |
| 2,760,585 | 8/1956 | Bergeron . | |
| 3,216,627 | * 11/1965 | Best et al. ........................... | 222/334 |
| 3,353,712 | 11/1967 | Prescott . | |
| 3,455,487 | * 7/1969 | Crippen et al. ...................... | 222/334 |
| 3,487,891 | 1/1970 | Pickle ................................. | 184/6 |
| 3,595,342 | 7/1971 | O'Leary .............................. | 184/56 |
| 3,604,534 | 9/1971 | Whitaker ............................. | 184/7 |
| 3,609,066 | 9/1971 | Wegmann ............................ | 417/344 |
| 3,830,405 | * 8/1974 | Jaeger ................................. | 222/334 |
| 3,882,882 | * 5/1975 | Preisig ................................. | 222/334 |
| 3,884,391 | * 5/1975 | Pauliukonis ......................... | 222/334 |
| 3,913,797 | 10/1975 | Brym .................................. | 222/253 |
| 3,966,019 | 6/1976 | Heikkila et al. ..................... | 184/7 |
| 4,027,744 | * 6/1977 | Kuhnelt et al. ...................... | 184/7.4 |
| 4,090,964 | * 5/1978 | Bakken et al. ...................... | 222/334 |
| 4,157,132 | 6/1979 | Kramer ............................... | 184/7 |
| 4,199,858 | 4/1980 | Meijs . | |
| 4,413,647 | * 11/1983 | De Lorenzo et al. ................ | 222/334 |
| 4,508,183 | 4/1985 | Drummond et al. ................. | 175/69 |
| 4,736,873 | * 4/1988 | Patriquin ............................. | 222/249 |
| 4,759,427 | 7/1988 | Onose et al. ........................ | 184/6.26 |
| 4,895,205 | 1/1990 | Thompson et al. . | |
| 4,911,267 | 3/1990 | Matsuda et al. . | |
| 4,988,015 | 1/1991 | Price . | |
| 5,018,601 | 5/1991 | Waddington et al. . | |
| 5,038,893 | 8/1991 | Willner et al. ...................... | 184/7.4 |
| 5,060,761 | 10/1991 | Arndt et al. ......................... | 184/6.14 |

(List continued on next page.)

FOREIGN PATENT DOCUMENTS

| | | |
|---|---|---|
| DD 252 869 A1 | 12/1987 | (DE) . |
| DD 253 467 A1 | 1/1988 | (DE) . |
| 0 140 265 A2 | 5/1985 | (EP) . |
| 2 268 222 | 11/1975 | (FR) . |
| 2 403 512 | 4/1979 | (FR) . |
| WO 99/60245 | 11/1999 | (WO) . |
| WO 00/14375 | 3/2000 | (WO) . |
| WO 01/11181 | 2/2001 | (WO) . |

Primary Examiner—David A. Bucci
Assistant Examiner—Chong H. Kim
(74) Attorney, Agent, or Firm—Senniger, Powers, Leavitt & Roedel

(57) ABSTRACT

A dispenser for ejecting a volume of fluid. The dispenser is adapted for connection thereof in a system for supplying fluid under pressure thereto for charging it with fluid to be dispensed. A system for delivery of the volume of fluid ejected by the dispenser includes a discharge valve adapted to be closed for the charging of the dispenser and to be opened for ejecting the volume. An energy accumulator for accumulating energy for actuating the dispenser to eject the volume of fluid is accumulative of the dispenser-actuable energy in response to the supplying of fluid under pressure to the dispenser for charging it.

16 Claims, 9 Drawing Sheets

U.S. PATENT DOCUMENTS

| | | | |
|---|---|---|---|
| 5,285,871 | 2/1994 | Sievenpiper | 184/7.4 |
| 5,404,920 * | 4/1995 | Custer | 222/249 |
| 5,476,193 * | 12/1995 | Haynes | 222/249 |
| 5,497,852 * | 3/1996 | Little et al. | 184/7.4 |
| 5,518,076 | 5/1996 | Hotz et al. . | |
| 5,556,007 * | 9/1996 | Breitsprecher | 222/249 |
| 5,779,098 * | 7/1998 | Fancher | 222/334 |
| 5,857,476 | 1/1999 | Bee et al. . | |
| 5,924,602 * | 7/1999 | Brown et al. | 222/334 |

* cited by examiner

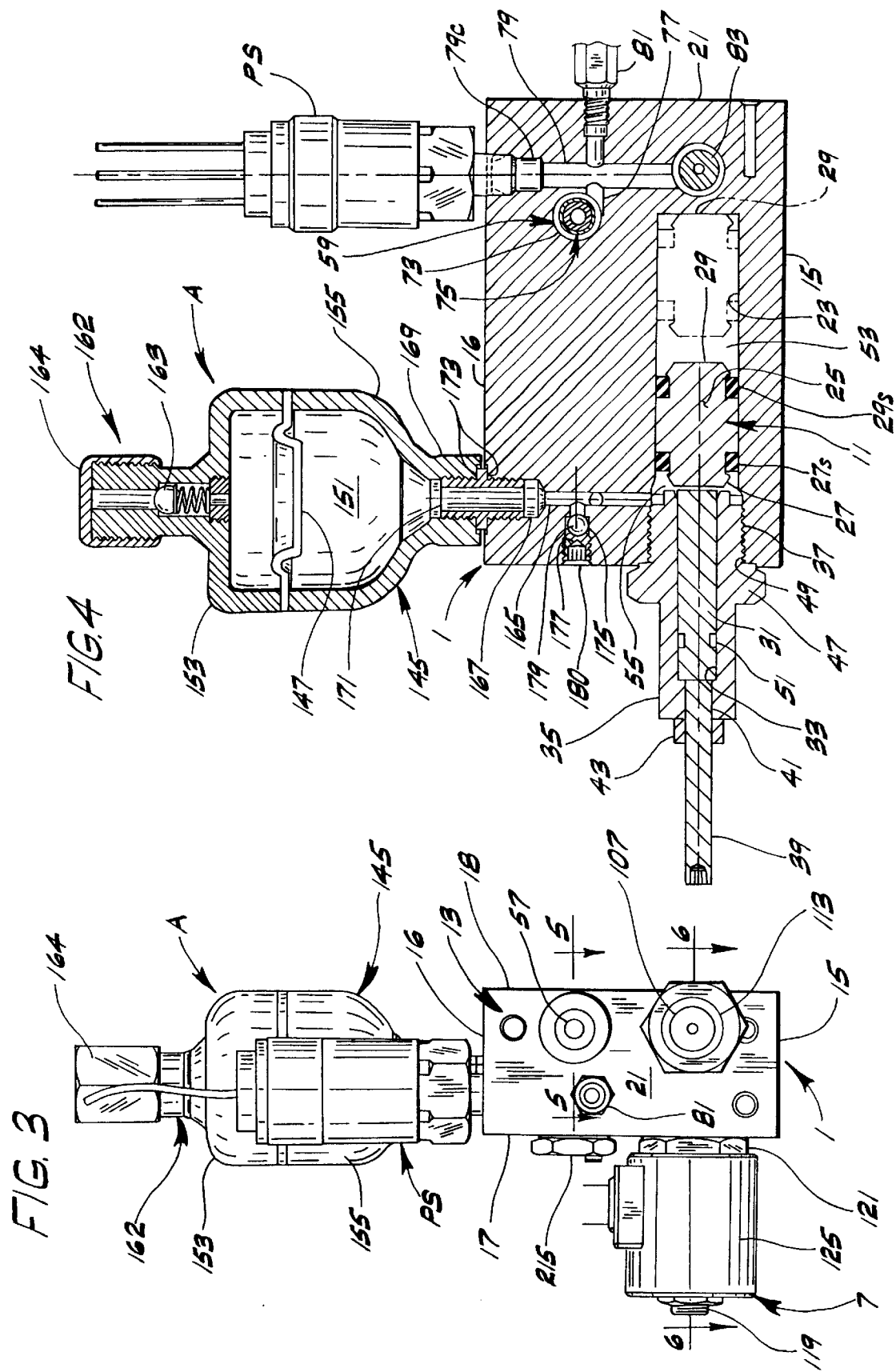

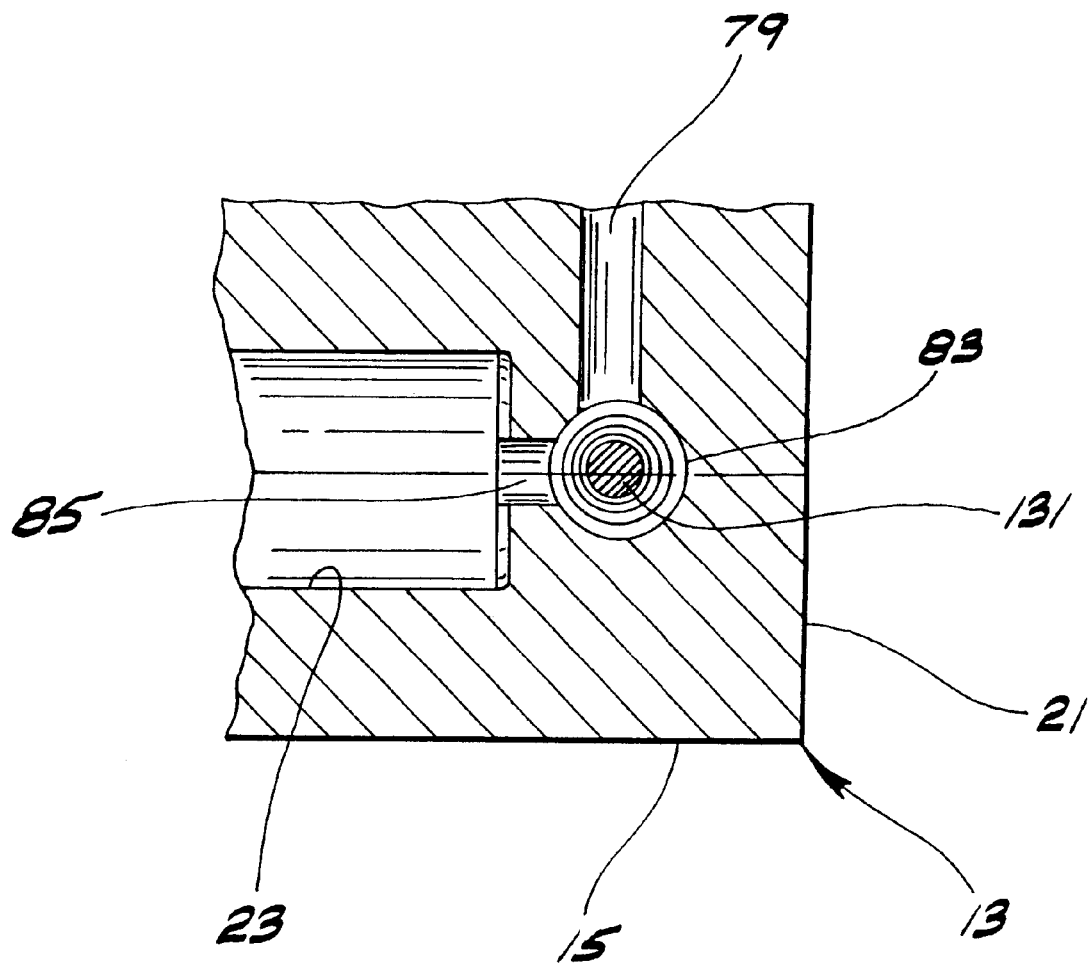

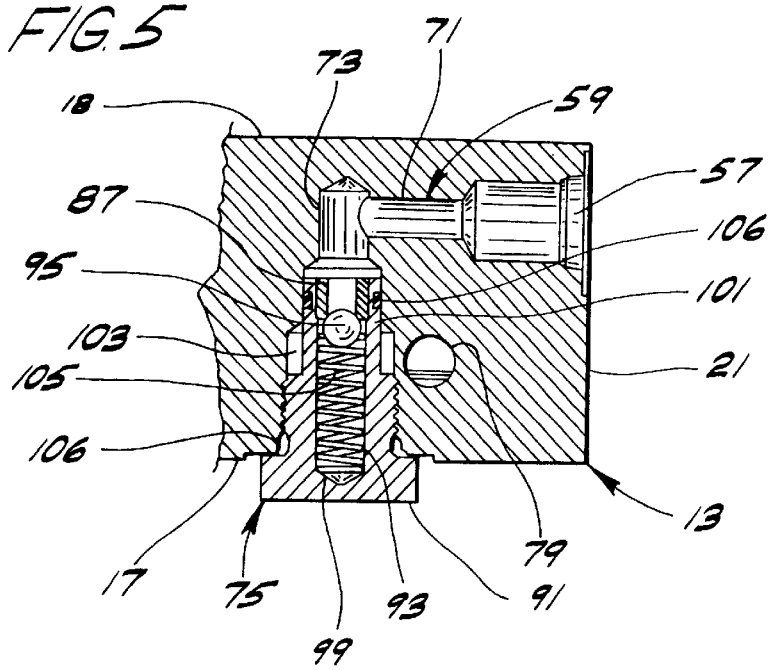
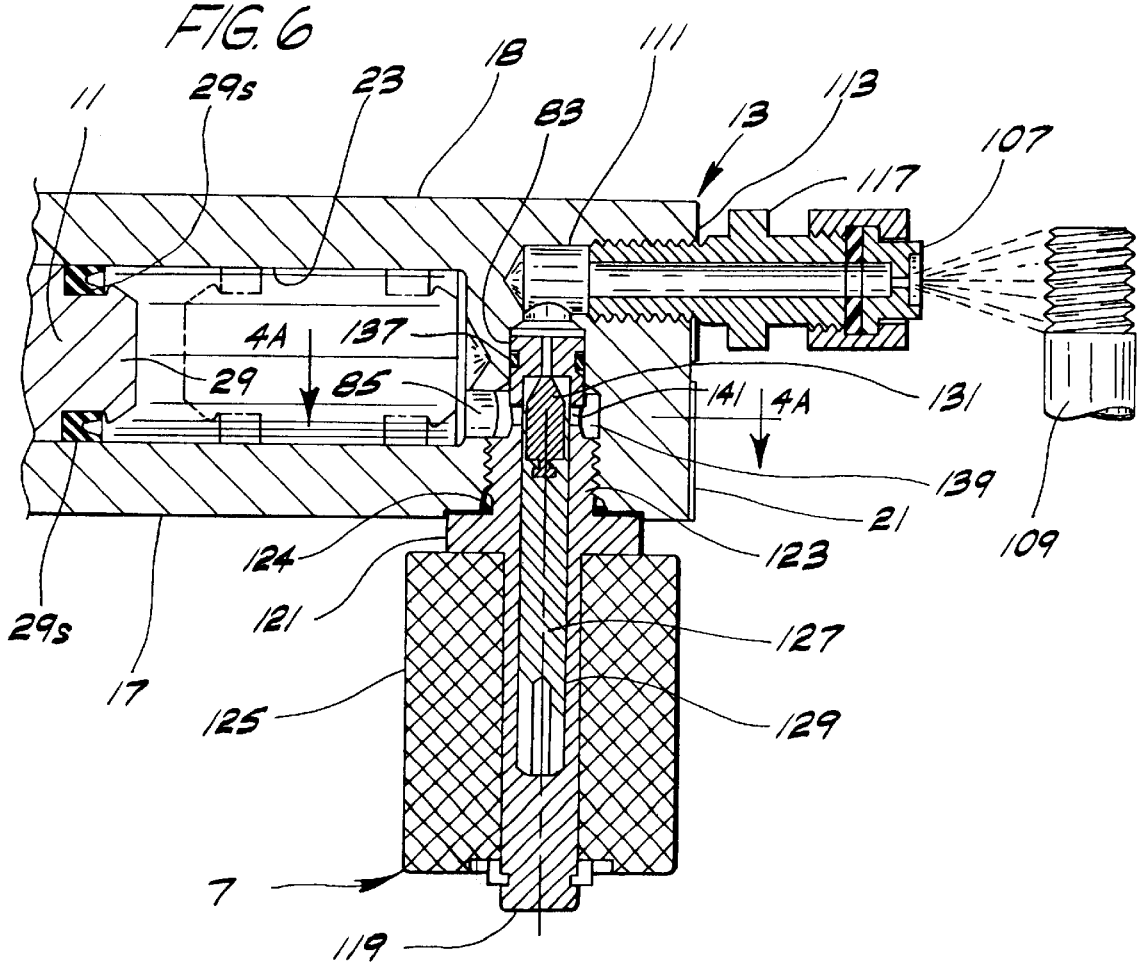

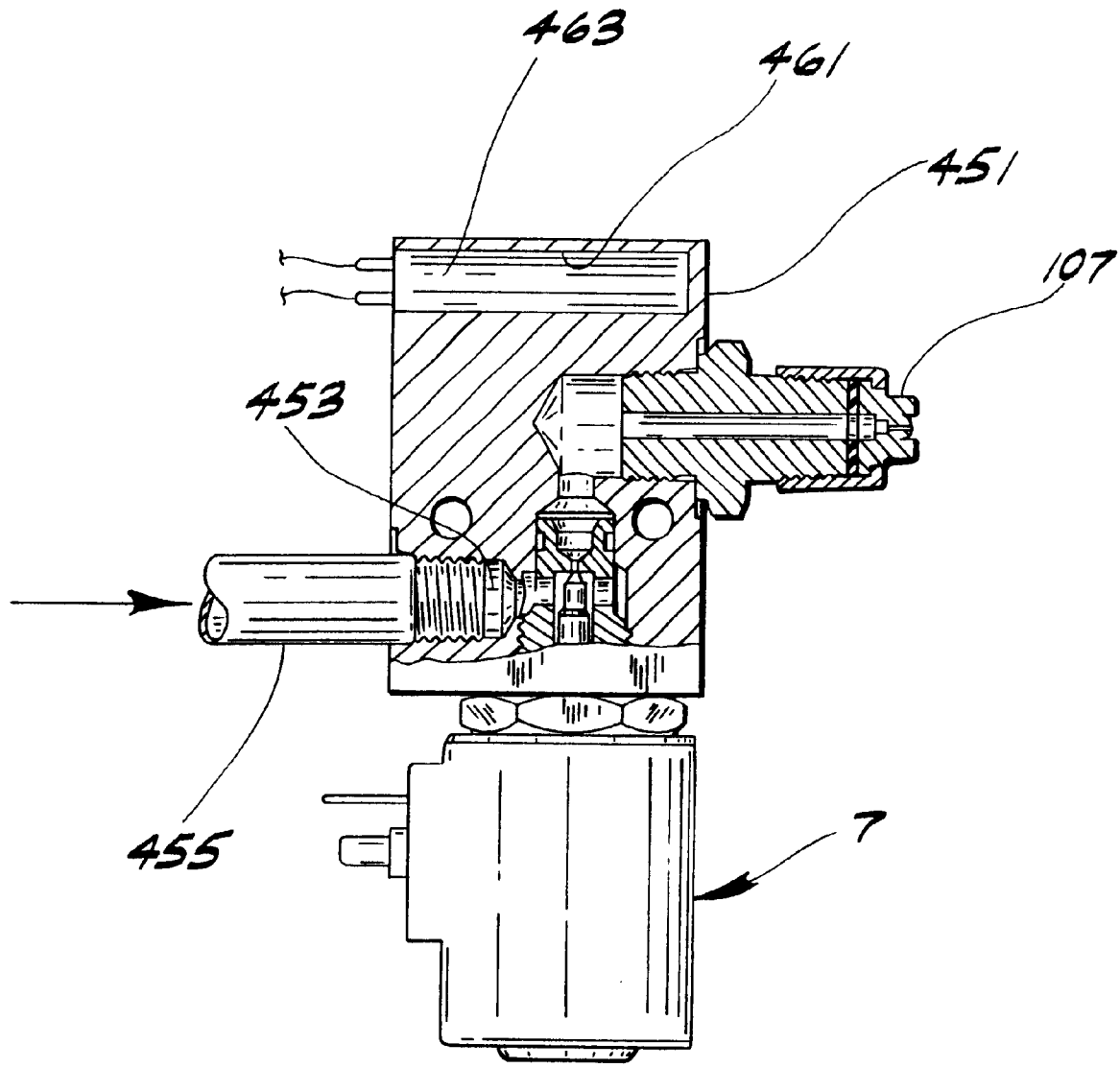

FLUID DISPENSING APPARATUS

BACKGROUND OF THE INVENTION

This invention relates in general to fluid dispensing apparatus, and more particularly to lubricant dispensing apparatus for delivering a charge of lubricant to a point of lubrication, e.g. by spraying the lubricant on an item to be lubricated.

The invention has been developed primarily though not exclusively as a means for efficiently and reliably carrying out in the field the lubrication of threaded connections of drill tubes used in drilling long blast holes in oil and gas exploration operations, lubrication of the connections facilitating the end-to-end assembly of the drill tubes. Heretofore, lubrication of such connections has generally been carried out either manually or (frequently inadequately) with air-operated pumps. Manual lubrication requires the drilling operator to lose productive time by having to get out of his cab to apply the lubricant to the threaded connection by hand. Application by use of air-operated pumps to spray the lubricant on the threaded connections is generally ineffective to provide a good quality spray at temperatures ranging from +160° F. (+71° C.) to −20° F. (−29° C.); at low temperatures air-operated pumps may even become inoperable. The invention has also taken into account the problem that certain zinc or copper-based greases specially formulated for lubricating drill tube connections are very difficult to pump and spray.

SUMMARY OF THE INVENTION

Accordingly, among the several objects of the invention may be noted the provision of lubricant dispensing apparatus particularly for reliably and efficiently spraying lubricant on the threaded connections of drill tubes or open gears, even at low temperatures in the field, and enabling use of the aforesaid specially formulated lubricants; the provision of such apparatus which is readily adjustable to dispense or spray charges of lubricant of different selected volumes (ranging, for example, from 0.5 cubic inch to 2.00 cubic inches); and the provision of such apparatus which obtains power for a spraying operation solely from pressure of lubricant supplied thereto.

While the invention as it has been developed has been embodied in apparatus for spraying a charge of lubricant on a blast drill tube threaded connection, it is to be understood that the principles of the invention are also applicable to dispensing apparatus for fluids other than lubricants, for example sealants and adhesives, and to dispensing apparatus useful in packaging operations for dispensing measured or metered charges of fluid to packages. The term "fluid" as used herein is intended to cover principally any non-gaseous fluid, including viscous fluids such as greases.

In general, fluid dispensing apparatus of this invention fundamentally comprises a dispenser for ejecting a predetermined volume of fluid. The dispenser is adapted for connection in a system for supplying fluid under pressure to the dispenser for charging it with fluid to be dispensed. A system for delivery of said predetermined volume of fluid ejected by the dispenser includes a discharge valve which is adapted to be closed for the charging of the dispenser and opened for ejecting said volume. An energy accumulator for accumulating energy for actuating the dispenser to eject said volume of fluid is accumulative of said dispenser-actuable energy in response to the supplying of fluid under pressure to said dispenser for charging it. In one embodiment, the dispensing apparatus is a lubricant dispensing apparatus, the dispenser is an expansible chamber device, specifically a cylinder and piston device, and the accumulator is a pressurized gas device.

Other objects and features will be in part apparent and in part pointed out hereinafter.

BRIEF DESCRIPTION OF THE DRAWINGS

FIG. 3 is a view in end elevation of the dispenser as viewed from the right of FIGS. 1 and 2 (a view of what may be referred to as its forward end);

FIG. 4 is a view in vertical longitudinal cross section in part (the upper part) on a vertical longitudinal plane through the center of the accumulator and a pressure switch of the apparatus and in part (the lower part) on a vertical longitudinal plane through the axis of a cylinder of the apparatus, these planes being offset one from the other;

FIG. 4A is a fragmentary vertical section generally on line 4A—4A of FIG. 6 illustrating a port for entrance and exit of fluid (lubricant) to and from the cylinder;

Corresponding reference characters indicate corresponding parts throughout several views of the drawings.

DETAILED DESCRIPTION OF THE PREFERRED EMBODIMENT

Figure 7:
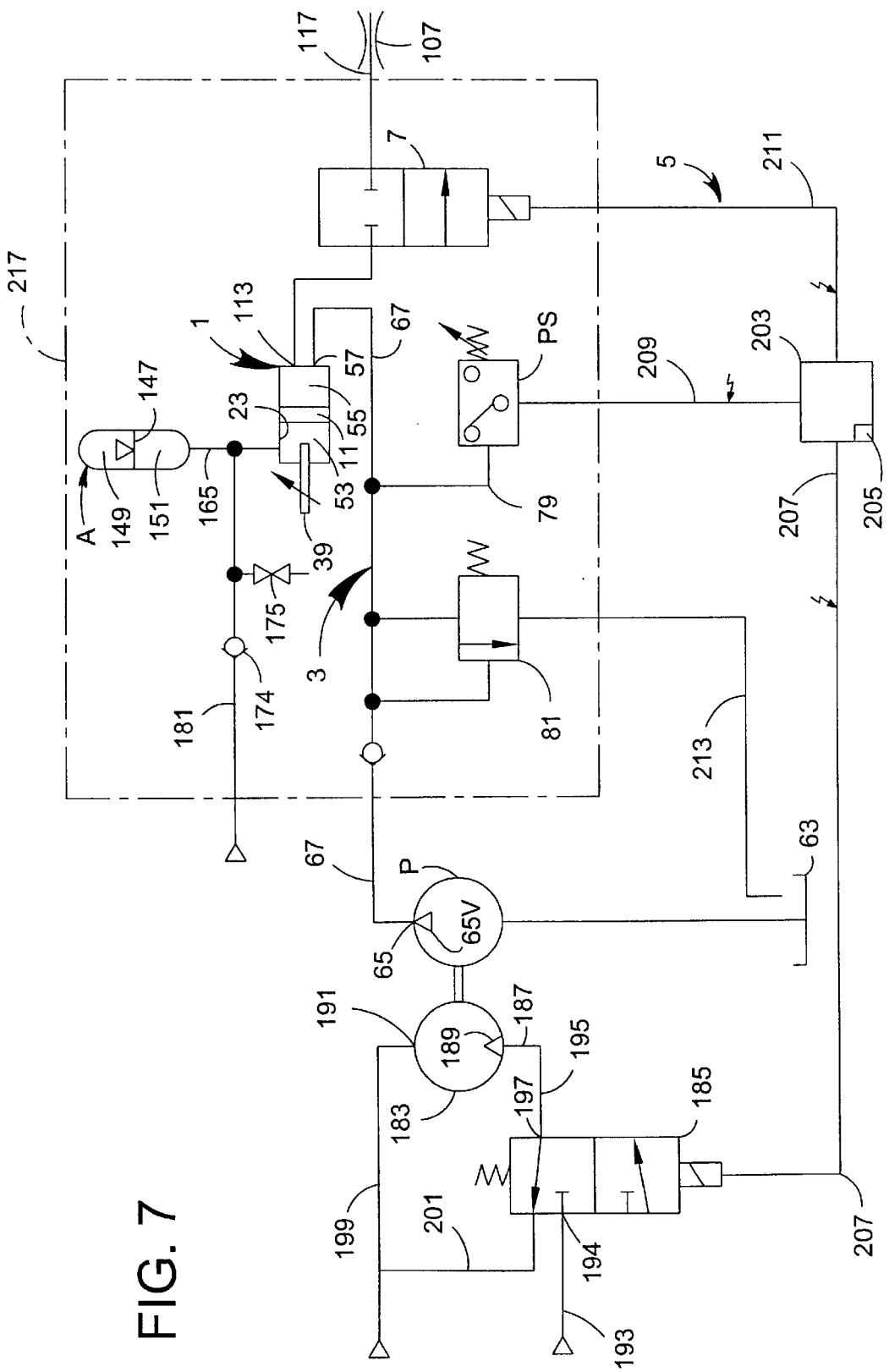
FIG. 7 is a diagrammatic view of the dispensing apparatus of this invention in its entirety including the dispenser, the system for supplying fluid (lubricant) thereto, the system for delivery of fluid (lubricant) from the dispenser, and the energy accumulator.
Figure 8:
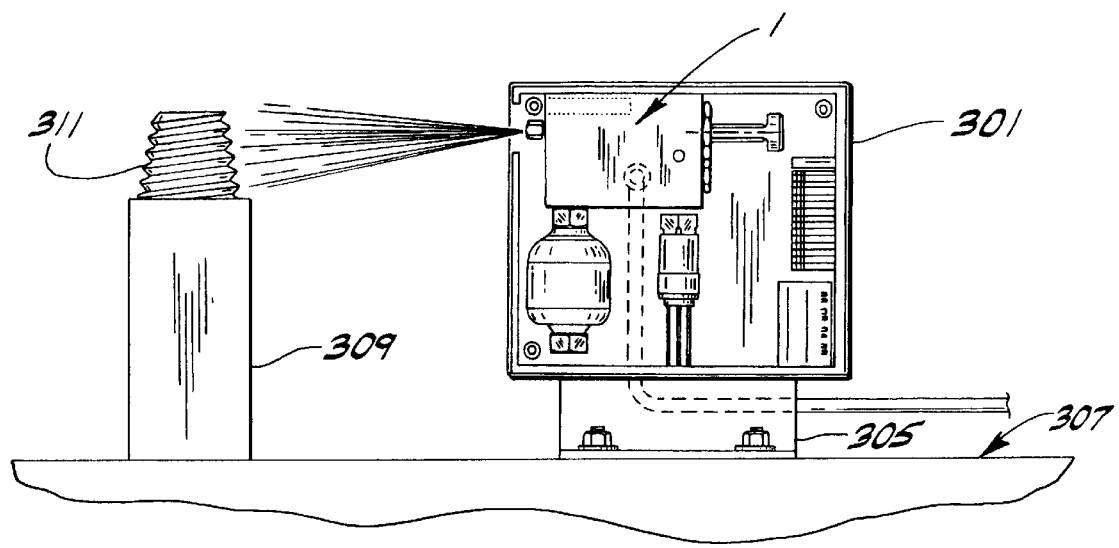
Figure 9:
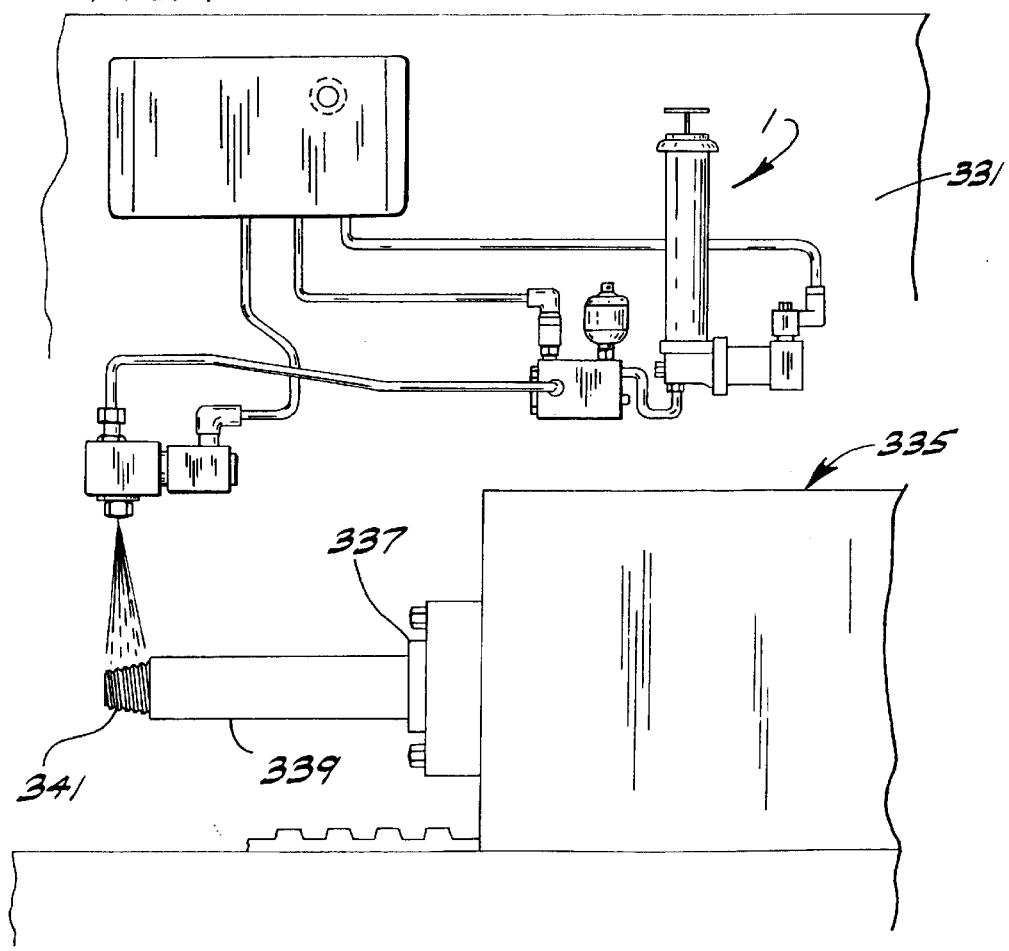
Figure 10:
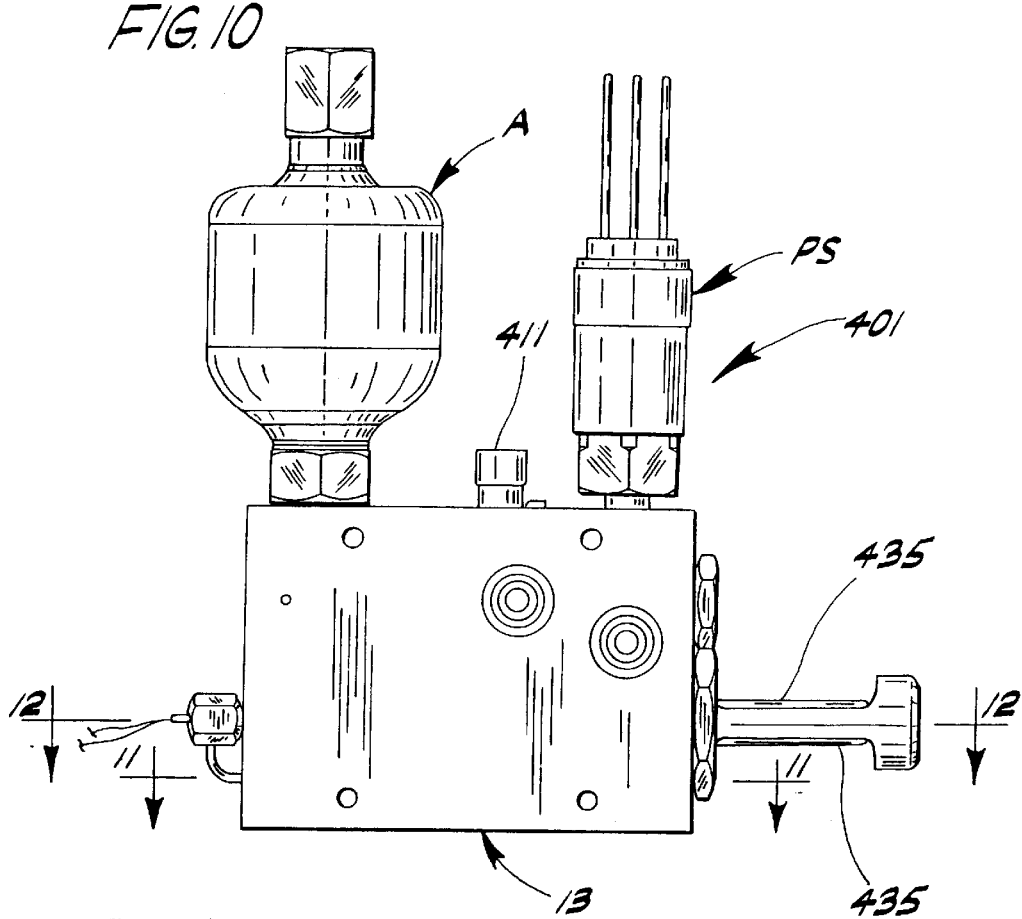
Figure 11:
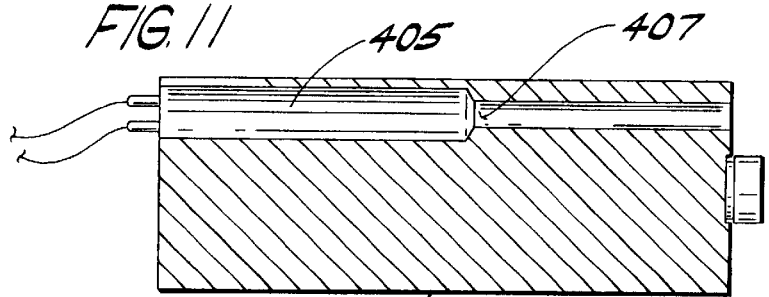
Figure 12:
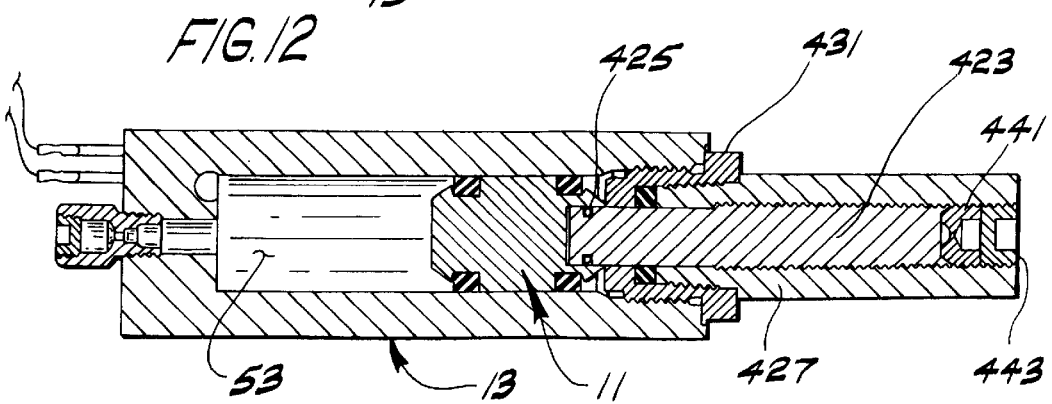

Referring to the drawings, which illustrate a preferred embodiment of the invention, a dispenser for ejecting a measured volume of fluid on each operation thereof is indicated in its entirety by the reference numeral 1. The dispenser is adapted for connection thereof and is shown in FIG. 7 as connected in a system designated in its entirety by the reference numeral 3 including a pump P for supplying fluid to be ejected thereby with the fluid so supplied under pressure for charging the dispenser with said fluid to be dispensed. A system designated in its entirety by the reference numeral 5 (FIG. 7) is provided for delivery (ejection) of the stated measured volume of fluid on each actuation of the dispenser. This system 5 includes a discharge valve 7 adapted to be closed for the charging of the dispenser 1 and to be opened for ejection of said measured volume of the fluid by the dispenser 1. An energy accumulator indicated in its entirety by the reference character A is provided for accumulating energy (power) for actuating the dispenser 1 to eject the stated volume of fluid (the charge), said accumulator being accumulative, i.e., adapted to accumulate, of the stated dispenser-actuable energy in response to the supplying of fluid under pressure to the dispenser for charging it.

In the specific aspect of the invention, the fluid which the dispenser 1 is to eject in measured volume on each actuation is a lubricant, such as one of the special greases above mentioned. For blast hole drill tube connection lubrication purposes, the volume may range from 0.5 cubic inch to 2.00 cubic inches, depending upon the size of the threaded connection, the dispenser being constructed in a manner for such volume adjustment as will appear. Broadly, the dispenser is an expansible chamber device having a rearward and a forward aspect and a member 11 movable in the device between a rearward retracted position and a forward position. More particularly, the dispenser 1 (the expansible chamber device) is a cylinder and piston device comprising a body or block 13 having a bottom 15, top 16, sides 17 and 18, side 17 being referred to as the right side, a rearward end 19 and a forward end 21, the body or block being formed with a cylindric bore 23 (FIG. 4) extending from its rearward end 19 toward but terminating somewhat short of its forward end 21. The bore 23 is drilled with its axis extending horizontally in the central vertical plane of the body adjacent the bottom 15 of the body and constitutes the cylinder of the cylinder and piston device, said device having piston 11 (the movable part) slidably reciprocal in sealed relation in the cylinder between the retracted position in which it is shown in solid lines in FIG. 4 adjacent the rearward end of the cylinder and a forward position such as shown in phantom in FIG. 4. The forward movement of the piston from its said retracted to its said forward position may be referred to as its forward delivery or ejection stroke, and its rearward movement from its forward position back to its retracted position may be referred to as its return stroke.

As shown, the piston 11 has a central portion 25 of a diameter corresponding to the internal diameter of cylinder 23 and rearward and forward reduced diameter extensions 27 and 29 having slightly enlarged tapered ends. The piston is provided with suitable seals such as indicated at 27s and 29s surrounding the piston extensions for sealing slidably against the surface of the cylinder 23. The rearward side of the seal 27s and the rearward side of the rearward extension 27 constitute the rearward side or face of the piston; the forward side of the seal 29s and the forward extension 29 constitute the forward face or side of the piston.

The rearward retracted position of the piston 11 (solid lines, FIG. 4) is determined by engagement of the end of the rearward extension 27 of the piston with a stop 31 at the rearward end of the cylinder 23. The stop is adjustable axially of the cylinder to vary the retracted position of the piston thereby to vary the volume of lubricant ejected on a delivery or ejection stroke of the piston. As shown, the stop 31 comprises a relatively short length of rod slidable axially with respect to the cylinder in a bore 33 in a fitting 35 threaded as indicated at 37 in the rearward end of the cylinder, the stop (the rod) being backed by an adjusting screw 39 threaded in an axially extending tapped hole 41 in the fitting with a lock nut 43 for locking the screw in axially adjusted position. The forward end of bore 33 is tapered as shown in FIG. 4. The fitting has a hexagonal head 47 for application of a tool for threading it in the rearward end of the cylinder and is formed for provision of a seal 49 for sealing it in place. A seal 51 is provided for the stop (the rod) 35 in bore 33. The arrangement is such that by adjusting the screw 39 to hold the stop from backing off (moving rearward) in the fitting 35 from a selected position with respect to the fitting, different selected retracted positions may be determined for the piston, the retracted position being determined by engagement of the rearward end of the rearward extension 29 of the piston with the forward end of the stop and engagement of the stop with the screw 39.

The piston 11 divides the space in cylinder 23 into a forward expansible and contractible chamber 53, which may be referred to as the first chamber, and a rearward expansible and contractible chamber 55 which may be referred to as the second chamber. The body (or block) 13 has an inlet 57 for lubricant under pressure in its forward end 21 and passaging 59 (FIG. 5) providing communication from the inlet to the stated first or forward chamber 53 in cylinder 23. The body 13 is adapted for connection thereof and is shown in FIG. 7 as connected in the system, indicated as aforesaid at 3 in its entirety, for supplying lubricant under pressure to the forward (first) chamber 53, the pressurized lubricant supplied to chamber 53 being operable to drive the piston 11 rearward to its retracted position against the forward end of stop 31 and thereby to expand and fill the forward (first) chamber 53 for a dispensing operation. Thus, pressurized lubricant delivered by pump P (see FIG. 7) to said forward chamber 53 is operable to drive the piston 11 rearward to its retracted position determined by engagement of the piston (more particularly by engagement of the rearward end of piston extension 27) with the stop 31, thereby to expand the forward chamber 53 which becomes filled with lubricant.

The above-noted system 3 (diagrammed in FIG. 7) for supplying lubricant (the fluid to be ejected) under pressure to the dispenser 1 for ejection thereby is shown primarily to comprise the pump P which takes in lubricant from a lubricant supply indicated diagrammatically at 63 (the lubricant reservoir or container). The pump has an outlet indicated at 65, which may have an outlet check valve as indicated at 65v, connected as by the lubricant supply line indicated at 67 to inlet 57 of the dispenser 1 for charging the dispenser. The inlet 57 is at the forward end of the dispenser body. Extending rearward from the inlet in the body is passaging 71 (FIG. 5) leading to cross-passaging 73 including an inlet check valve indicated in its entirety at 75, from which cross-passaging a passage 77 extends generally tangentially with respect to passage 73 forward from the latter to a vertical passage 79. Passage 77 is drilled in to passage 79 from the forward end 21 of the body 13 and is provided at its outer end (at the forward end of the body) with a pressure relief valve 81 adapted to relieve pressure in passage 79 should it become excessive-over 4000 psi, for example. Valve 81 is a conventional pressure relief valve such as a Model 90942 valve sold by Lincoln Industrial, of St. Louis, Mo. It will be observed that the vertical passage 79 is offset from the vertical plane of the axis of cylinder 23 toward the right side 17 of the body 13 although appearing in FIG. 4 as in the same vertical plane as said axis in FIG. 4 for convenience of illustration.

Passage 79 extends down to a bore 83 (see FIGS. 4 and 6) which extends transversely with respect to the body 13 somewhat forward of the forward end of the cylinder 23. Bore 83 is drilled into the body 13 from the right side 17 of the body, terminating short of the left side 18. The vertical passage 79 and bore 83 are coplanar in a vertical transverse plane of the body somewhat forward of the forward end of the cylinder. A fluid pressure (lubricant) switch PS such as a Model 92201-BB3 switch sold by Barksdale of Los Angeles, Calif. is sealingly secured at its lower end on top of the body 13 in a pipe thread 79c at the upper end of passage 79. A passage or port 85 (see FIG. 6) extends rearward from the bore 83 to the forward end of the cylinder 23 providing communication between them. The arrangement is such that lubricant delivered under pressure to the dispenser inlet 57 by the pump P via line 67 flows through passage 71 to passage 73, opens the inlet check valve 75, flows through passage 77 to vertical passage 79, thence via bore 83 and passage or port 85 into the forward end of cylinder 23. The pressure switch PS, which is normally open, is closed when the pressure reaches a predetermined value.

Figure 5:
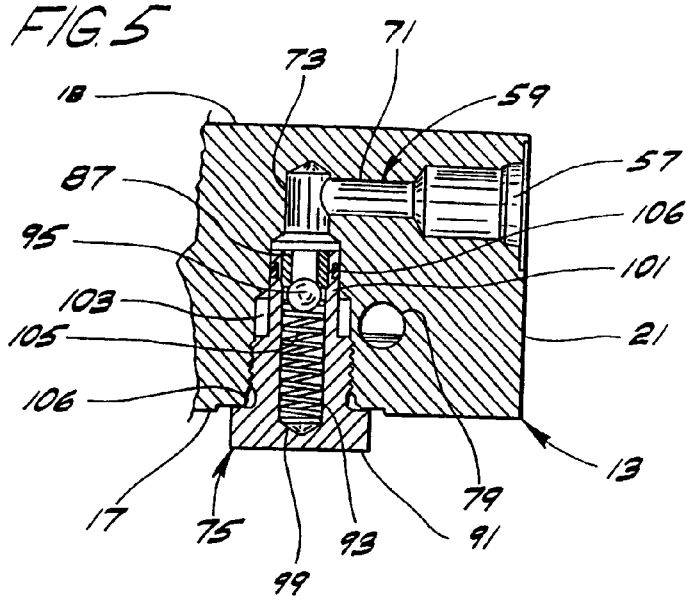
FIG. 5 is a fragmentary horizontal transverse section taken generally on line 5—5 of FIG. 3.

As shown in FIG. 5, the inlet check valve 75 comprises a valve seat 87 press fitted into a fitting 91 that is upstream from passage 71. The fitting 91 is threaded in and closes the outer end of passage 73 and has a bore 93 in which a valve ball 95 is movable into and out of engagement with the seat, being biased to closed position engaging the seat by a coil compression spring 99. The fitting has a reduced-diameter section 101 providing an annular chamber 103 around said section in passage 73, the tangential passage 77 extending forward from the lower region of this chamber to said vertical passage 79. The fitting 91 has radial ports such as indicated at 105 communicating with annular chamber 103. Seals for the inlet check valve are indicated at 106. The arrangement is such that lubricant delivered under pressure to the dispenser inlet 57 flows through passage 71 into passage 73, opens the ball 95 against the bias of spring 99, flows through the bore 93 of the fitting 91, and then flows through radial ports 105, chamber 103 and passages 77 and 79, bore 83 and passage (port) 85 into the forward end of the cylinder 23 (i.e. into the forward expansible chamber 53 of the cylinder). The forward chamber 53 of the cylinder is thus charged with lubricant, the charge being a metered (measured) volume (or charge) as will be later explained.

The system indicated in its entirety by the reference numeral 5 is provided for the flow of the metered (measured) volume of lubricant constituting the charge of lubricant from the forward chamber 53 of the cylinder 23, i.e. for ejection of said metered volume of lubricant from cylinder 23, for being sprayed via a spray nozzle 107 (FIG. 6) on a drill tube threaded connection 109 to be lubricated on forward movement of piston 11 from its retracted position through a forward (delivery) stroke. This system includes a lubricant outlet passage 111 in body 13 for flow of lubricant from the forward chamber 53 via bore 83 to a lubricant outlet 113 in the forward end 21 of body 13, with discharge valve 7 mounted in said bore 83 on the right side of 17 of the body 13. The spray nozzle 107 is at the end of a lubricant line 117 connected to the lubricant outlet 113. The line 117 may comprise a short nozzle adapter shown in FIG. 6 or a long line for spraying at a location remote from the body 13. The spray nozzle can, if so desired, be configured to provide a selected fluid spray pattern, such as nozzle Model No. TP 2500080 TC sold by Spraying Systems Co., of Wheaton, Ill. The discharge valve 7 is a solenoid valve adapted to be closed when deenergized to block flow of lubricant to the spray nozzle so as to enable the supply of the forward cylinder chamber 53 with lubricant and to be opened on being energized for the delivery of said metered volume of lubricant (the charge) to and through the spray nozzle 107 onto the threaded connection 109 to be lubricated (the point of lubrication). The discharge valve 7, or accumulator A, among other elements, can be located remote from the body 13 without departing from the scope of the present invention.

Figure 6:
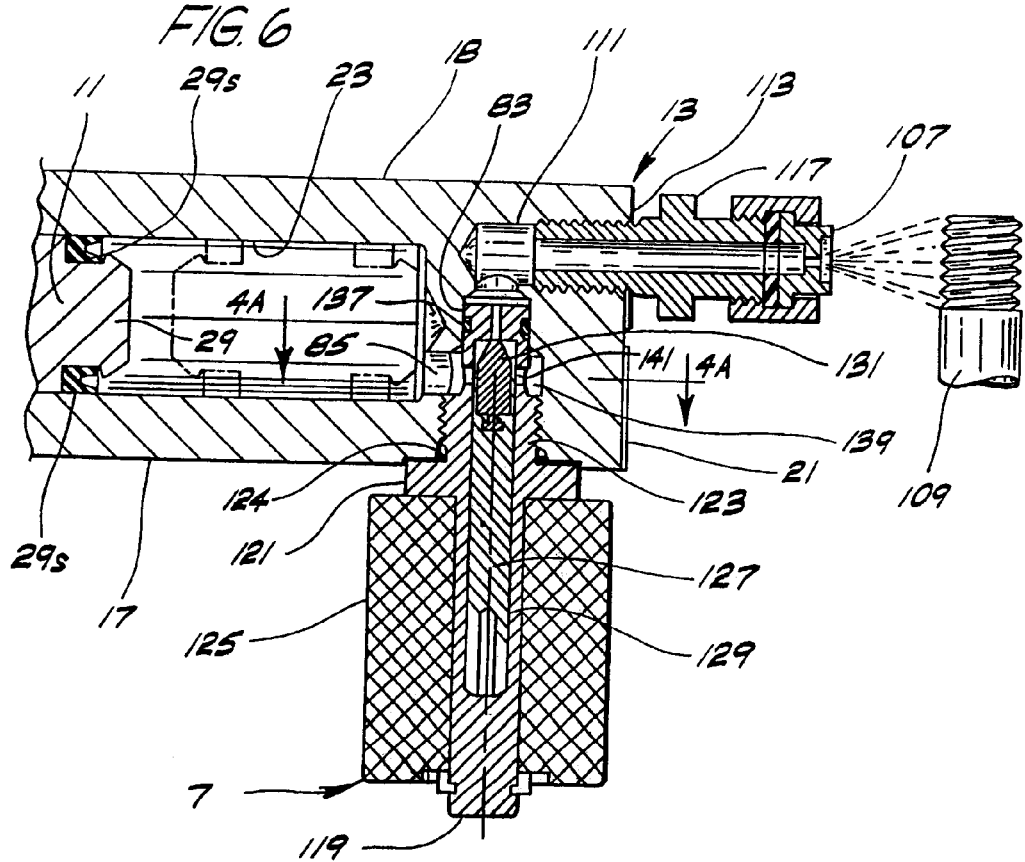
FIG. 6 is a fragmentary horizontal transverse section taken generally on line 6—6 of FIG. 3, showing diagrammatically in phantom an outlet line extending from the outlet of the dispenser to a spray nozzle positioned to spray lubricant on a threaded connection.
Figure 7:
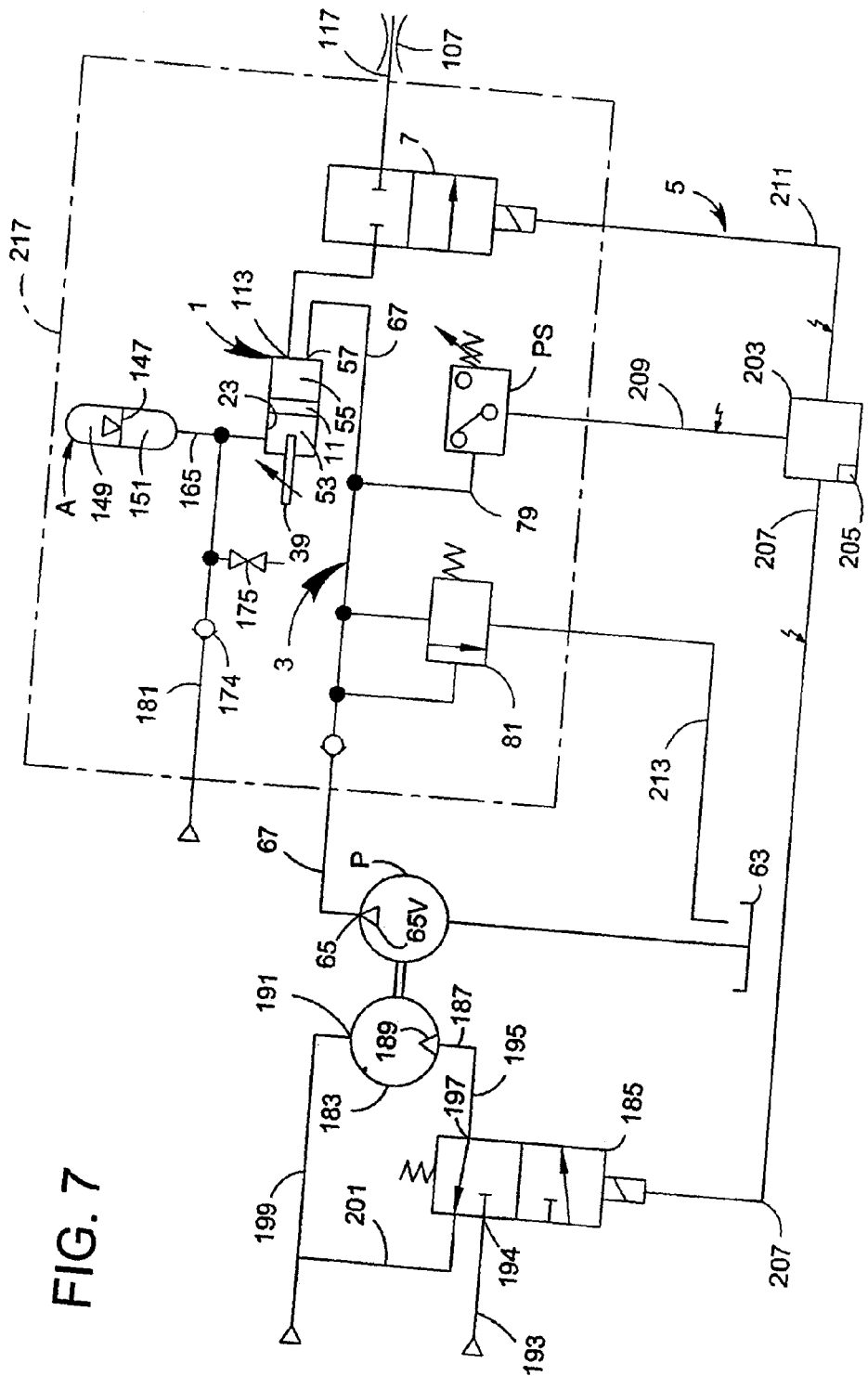

As shown in detail in FIG. 6 the discharge valve, such as model # SV58-26-0-P-00, manufactured by Hydraforce Inc., of Lincolnshire, Ill., comprises a non-magnetic core 119 having a hexagonal head 121 and a threaded extension 123 threaded in the outer end of the bore 83 with a seal 124. It further comprises a coil 125 on the core and a magnetic valve member 127 slidable in a bore 129 in the core, the valve member comprising an elongate magnetic rod actuable by energization of the coil having a tapered tip 131 engageable with (and disengageable from) a valve seat 133 lodged in a reduced-diameter inner end of core extension 123 with a seal 137. The core extension 123 has a reduced diameter section providing an annular chamber 139 in passage 83.

Figure 1:
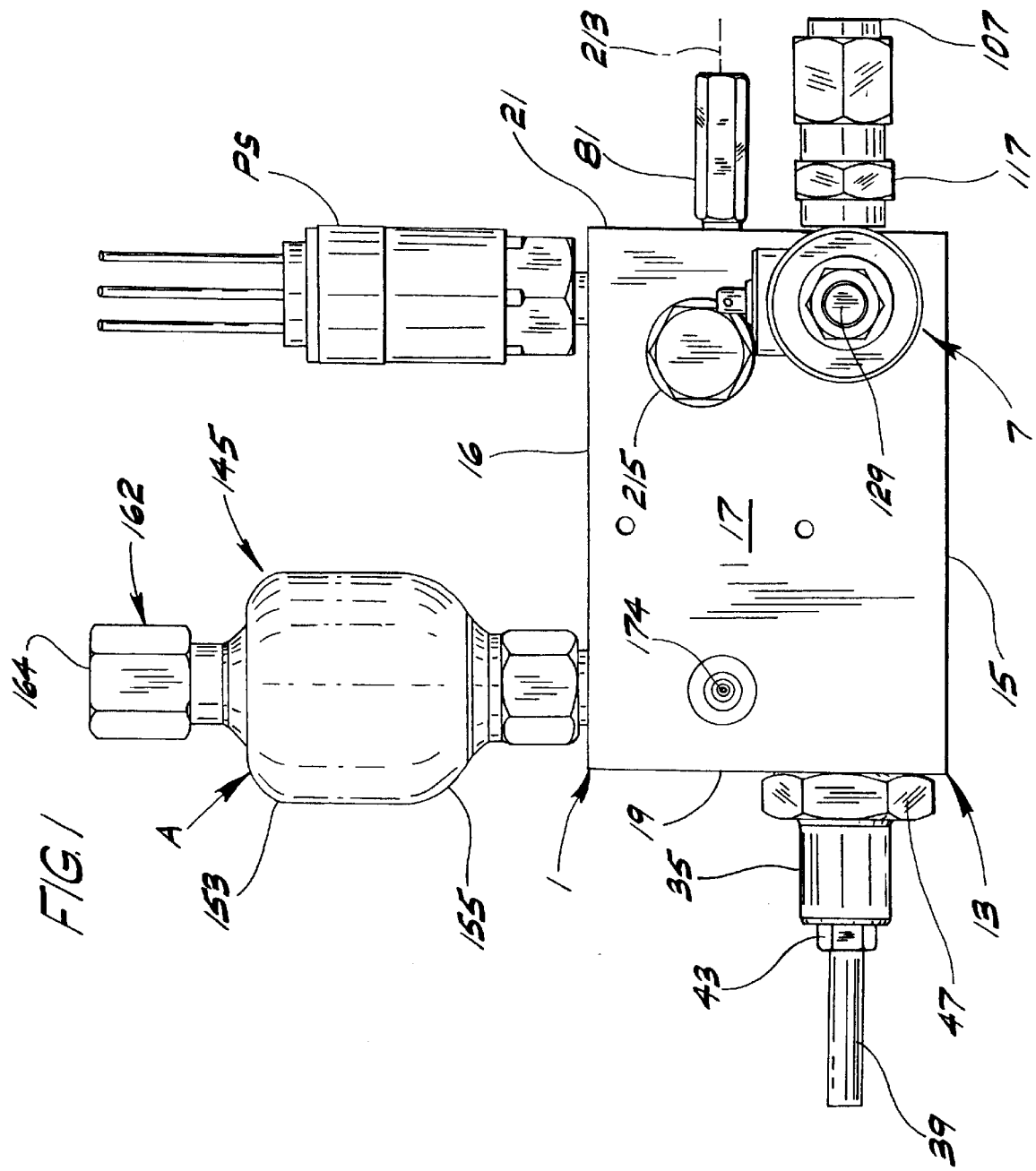
FIG. 1 is a view in elevation of one side of a dispenser of the invention (this side being referred to as the right side)
Figure 2:
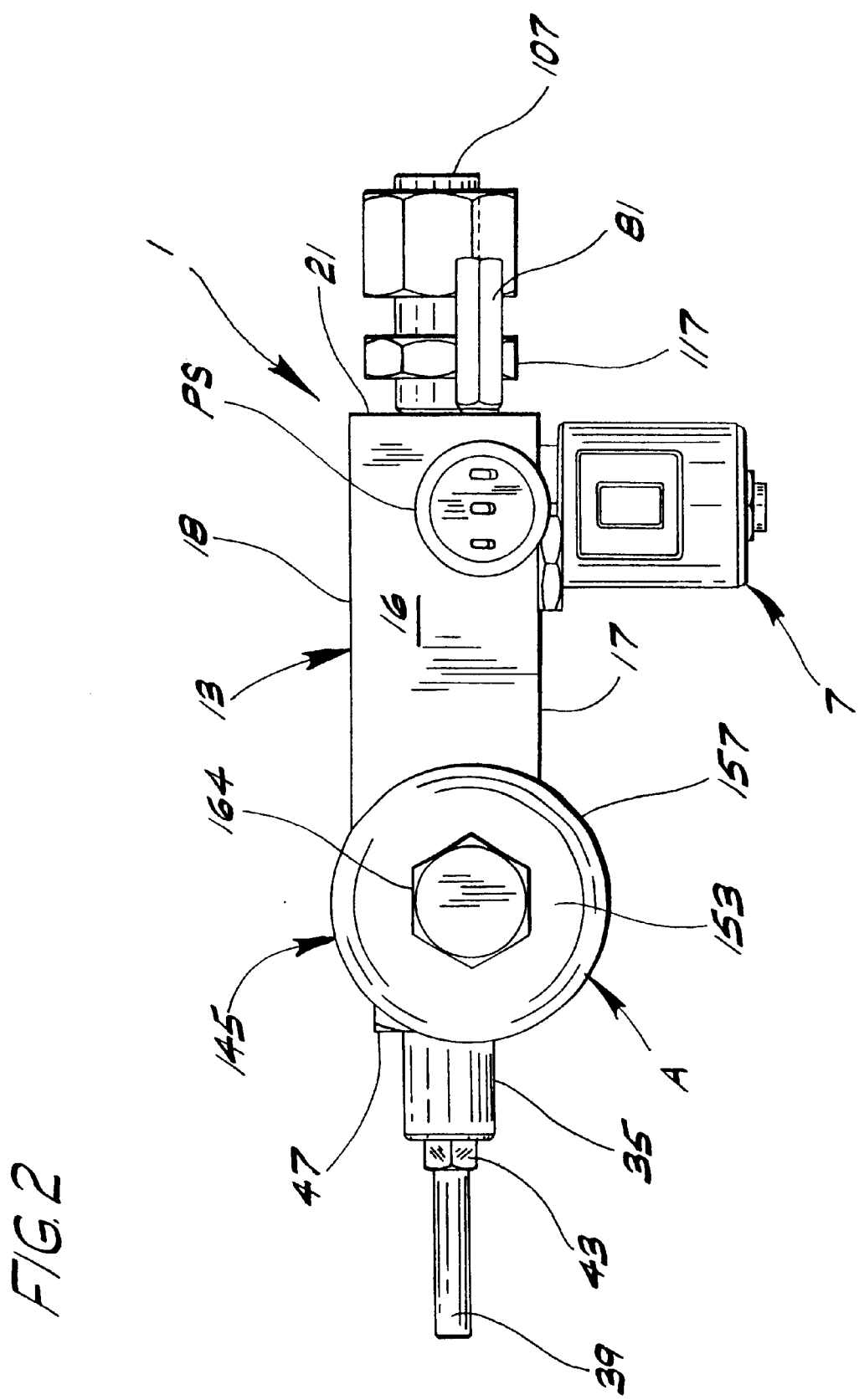
FIG. 2 is a view in plan of the dispenser.

The core extension 123 has radial ports 141 that permit flow of lubricant from the annular chamber 139 to outlet passage 111. The passage or port 85 provides for communication between the annular chamber 139 and the forward end of the cylinder 23 (the forward chamber 53 of the cylinder). The aforesaid vertical passage 79 extends down to the annular chamber 139. As shown in FIGS. 1–3 the discharge valve 7 is mounted on the right side 17 of the body 13 and functions to close and open communication between the forward end of the cylinder 23 and outlet 113. However, in FIG. 7 the discharge valve 7 is shown in line downstream from the body 13 for convenience of illustration.

Mounted on top of the body 13 (along with pressure switch PS) is the energy accumulator A, which may also be referred to as a power accumulator, for accumulating energy (power) for driving the piston 11 forward in cylinder 23 through a forward delivery stroke (after expansion and filling of forward chamber 53 of the cylinder) to eject the stated metered volume of lubricant, delivering it through spray nozzle 107. Accumulator A is accumulative of piston-driving energy (power) in response to the supplying of lubricant under pressure to the forward chamber 53. For this purpose, the accumulator is a pressurized gas device, which acts to accumulate energy (power) for actuating the piston 11 (the "movable member") through a delivery stroke in response to the supplying of lubricant under pressure to the forward chamber 53 of the cylinder 23. Thus, the accumulator A acts like a compression spring, storing energy on compression of the spring, or like a tension spring, storing energy on tensioning thereof, all in response to movement of the piston from its forward to its retracted position on loading of the forward expansible and contractible chamber 53 (with the resultant expansion of the forward chamber 53 and contraction of the rearward chamber 55). The accumulator of the present invention may comprise a spring or other alternate type of device for storing energy without departing from the scope of this invention.

In detail, the accumulator A comprises a hollow body 145 having what in a broad sense amounts to a movable partition or separator 147 therein dividing the space in the hollow body into an expansible and contractible gas chamber 149 on one side (the top side as illustrated) of the separator and an expansible and contractible chamber 151 for hydraulic fluid such as oil on the other side (the bottom side) of the separator. The movable separator 147 is specifically a flexible diaphragm made of nitrile, for example, with a corrugation for flexibility, and will be so referred to hereinafter. The hollow body 145 is made up of an upper generally cup-shaped or bell-shaped part 153 disposed open end down and a lower generally cup-shaped or bell-shaped part 155 disposed open end up, the diaphragm being sealingly clamped all around its peripheral margin between the open ends of the members 153 and 155. The cup-shaped parts are held together with the margin of the diaphragm clamped between members 153 and 155, which are welded together.

The gas chamber 149 which is the upper of the two chambers 149 and 151 as the accumulator A is mounted on top of the body 13, is charged with gas, e.g. nitrogen, under pressure, e.g. 1500 psi, and up to 2000 psi. The upper cupshaped part 149 has a suitable check valve means such as indicated at 162 at the top for the charging of chamber 149 with the nitrogen (or other gas). This gas charge is a pre-charge, done at the place of manufacture, and is a permanent charge, sealed in the gas chamber 149 so that further recharging is seldom if ever ordinarily needed. The check valve means 162 is illustrated as having a spring-biased ball check 163 and a screw-threaded cap 164 (resembling a conventional tire valve).

Adjacent its rearward end 19 the dispenser body 13 has a vertical passage 165 (see FIG. 4) with a thread 167 at its upper end, this passage extending down to cylinder 23 adjacent the rearward end of the cylinder in the same vertical longitudinal plane as the vertical longitudinal plane of passage 79 (offset to the right of the vertical longitudinal plane of the axis of cylinder 23), although appearing in FIG. 4 as being in the same vertical plane as said axis for convenience of illustration. The accumulator A has a necked-down lower end 169 threaded on a tubular fitting 171 in turn threaded in the thread 167 with seals as indicated at 173 for the mounting of the accumulator A on the top of the body 13.

The hydraulic fluid (oil) chamber 151, the tubular fitting 171, the lower part of the thread 167 below the lower end of the fitting, the vertical passage 165 and the rearward chamber 55 of the cylinder 23, are charged with hydraulic fluid such as oil. This charge may be regarded as a permanent charge, effected at the place of manufacture of the dispenser 1 via a charging check valve 174 (FIG. 1) placed in a pipe thread in side 17 of body 13 which connects with passage 165. The check valve 174 may have a conventional valve ball and spring design, such as Lincoln model 130021-3, and it is arranged to open for the charging operation and to close via spring bias or pressure of hydraulic fluid (oil) in passage 165. In FIG. 7, there is shown a line 181 for the charging operation, check valve 174 being shown in line 181 for convenience of illustration.

A discharge valve 175 (FIG. 4), comprising a valve seat 177, valve ball 179, and a threaded plug 180 (or set screw), are placed in a threaded hole in rearward end 19 that connects to passage 165. In normal operation the valve ball 179 is held against seat 177, and the plug prevents any leakage of fluid. If the accumulator A unit is to be serviced, the hydraulic charge may be released to atmosphere by loosening the plug 180. This will allow the hydraulic pressure to move the ball 179 off the valve seat 177 and around the ball, out to atmosphere.

In dispensing apparatus of this invention for spraying lubricant such as grease on the part to be lubricated, the pump P is what is termed a lance pump for pumping lubricant from a drum containing lubricant, more particularly a pump of the type shown in the co-assigned U.S. patent application Ser. No. 09/151,526 filed Sep. 11, 1998 entitled Pump and especially a pump sold by the assignee's related company Lincoln Industrial, of St. Louis, Mo., under the trademark FLOW MASTER, Model No. 85483. This pump is driven by a rotary hydraulic motor indicated at 183 in FIG. 7, preferably a rotary hydraulic motor such as a Roller Vane rotor hydraulic motor sold by Parker Hannifin Corp. of Greeneville, Tenn., U.S.A. The hydraulic motor is under control of a solenoid valve 185. The hydraulic motor has an inlet indicated at 187 with an inlet check valve indicated at 189 and an outlet indicated at 191 (all in FIG. 7). A line 193 for supplying the motor with hydraulic fluid under pressure from a source thereof (not shown) is connected to an inlet 194 of the solenoid valve 185 and a line 195 extends from an outlet 197 of the valve to the inlet 187 of the motor. At 199 is shown a hydraulic fluid return line extending from the outlet 191 of the motor 183 back to the source (not shown) of motor-operating hydraulic fluid. This source may be one such as typically associated with drilling operations such as described above, e.g. a standard hydraulic fluid pump operable to pump hydraulic fluid from a sump, with return of said fluid to the sump. The solenoid valve 185 is connected in a line 201 by-passing the motor 183, the arrangement being such that the solenoid valve, when deenergized, acts to effect a by-pass via 199, 201, the valve and line 197 around the motor 183 as shown in FIG. 7, and when energized acts to deliver hydraulic fluid from the aforesaid source under pressure via line 195 to operate the motor and drive the pump P.

Referring to FIG. 7, there is indicated at 203 a controller with which is associated a push button control switch 205 (a manually operable switch) operable to start a cycle of operation of the apparatus to be described. A controller which has been used for the apparatus is a "Logo" Model 24R controller sold by Siemens A.G. Automation and Drives Division of Nuremberg, Germany. The controller is connected in a circuit indicated at 207 with the pump-motor-controlling solenoid valve 185, also connected in a circuit indicated at 209 with the pressure switch PS, and further connected in a circuit indicated at 211 with the discharge valve 7. The pressure relief valve 81, which acts to relieve the forward cylinder chamber 53, passages 85 and 79 and the pressure switch PS of excessive pressure (e.g. 4000 psi) has a lubricant line 213 extending therefrom that is vented to atmosphere. The relief valve 81 is shown in FIG. 7 upstream from dispenser 1 for convenience (rather than at the forward end of the dispenser). It could be located on the left side of the body (at 215, see FIGS. 1 and 3) in communication with passage 79, in which case passage 77 is closed at its outer end by a plug. At 217 in FIG. 7 is indicated in phantom a heated enclosure for the dispenser 1 and associated components 7, PS, 81 and accumulator A.

Assuming piston 11 is in its retracted position back against stop 31 (as shown in solid lines in FIG. 4), further assuming that the forward cylinder chamber 53 is fully charged with lubricant under pressure, that the discharge valve 7 is closed (holding in the charge), the solenoid valve 185 is deenergized and hence set to block flow of hydraulic fluid from line 193 to the pump motor 183, that pressure switch PS is closed by the lubricant under pressure (e.g. 3000 psi) in the cylinder 23 and hence in passage 79, and that the nitrogen gas in the gas chamber 149 of energy accumulator A is under increased pressure over and above its initial pressure, as a result of a previous operation of the apparatus, a cycle of operation of the apparatus may be considered to be initiated by the operator (as in the cab of the drilling equipment) pushing the push button 205 to initiate operation via controller 203. The controller 203 then acts to carry out a sequence of operations in which, first, the discharge valve 7 is energized and opened by completion of circuit 211 (valve member 127 with its tapered tip 131 is pulled away from seat 133) for discharge of lubricant from the cylinder 23. The piston 11 is driven forward through a delivery stroke by the gas pressure in accumulator chamber 149 acting through the flexible diaphragm 147 on the oil in accumulator chamber 151, counterbore 107, passage 79 and the rearward expansible chamber 55 of the cylinder 23, the piston being driven forward by the act until the forward end of piston extension 29 engages the forward end of the cylinder 23, which acts as a limit stop determining the length of the delivery stroke. As a result, a metered (measured) charge of lubricant equal in volume to the displacement of the piston 11 in the course of its delivery stroke is ejected from the cylinder 23 and delivered via dispenser outlet 113 and line 117 and the spray nozzle 107 for being sprayed on the threaded connection 109 to be lubricated. The delivery stroke may be regarded as the distance traveled forward by the rearward end of the rear piston extension 27 away from the forward end of stop 31, and may be set for whatever stroke and hence whatever volume of delivery is desired, within the limits determined by the length of the cylinder.

Typically, the cylinder is of such length and the adjustment of the rearward positioning of the stop 31 by the adjustment screw 39 are such as to be capable of effecting metered discharge of volumes of lubricant ranging from 0.5 cubic inch for the most forward position of stop 31 to 2.0 cubic inches for the most rearward position (as shown in FIG. 4) of the stop.

On delivery of the metered charge of lubricant from the cylinder 23 for the spraying operation, with the resultant drop in pressure in passage 79, pressure switch PS opens and breaks circuit 209. Controller 203 thereupon acts via circuit 211 to close discharge valve 7 to enable recharging the cylinder 23, and circuit 207 is completed to energize the solenoid valve 185, the latter shifting to place line 193 in communication with line 195, thereby supplying the hydraulic motor 183 with hydraulic fluid to drive pump P. The pump P delivers lubricant under pressure via line 67, inlet 57, passages 71 and 73, radial ports 105 (valve ball 95 opening under pressure), annular chamber 103, passages 77, 79 and 85 to the forward chamber 53 of cylinder 23, lubricant thus charging the cylinder, driving piston 11 back to its retracted position (such as shown in solid lines in FIG. 4). When the pressure of lubricant in passage 79 reaches the preset value (e.g. 3000 psi), pressure switch PS closes, and this signals the controller 203 via circuit 209 to break circuit 207 and deenergize solenoid valve 185 thereby returning the latter to its condition cutting off flow of hydraulic fluid to motor 183 and stopping pump P. As the piston 11 is driven back to its retracted position, it forces oil out of the rearward chamber of the cylinder 23 and into the oil chamber 151 of the accumulator A thus forcing the flexible diaphragm 147 upward and adding to the compression of the nitrogen gas in gas chamber 149 of the accumulator. Thus, the apparatus resumes the cycle-ready condition (ready for a spray operation) in which piston 11 is in retracted position and cylinder 23 is charged with lubricant, discharge valve 7 is closed holding in the charge, the pump P is off, pressure switch PS is closed, and the accumulator A is ready to supply the energy or force for driving the piston through a delivery stroke on the next cycle by reason of the compressed state of the nitrogen gas in gas chamber 149 of the accumulator.

As various changes could be made in the above constructions without departing from the scope of the invention, it is intended that all matter contained in the above description and shown in the accompanying drawings shall be interpreted as illustrative and not in a limiting sense.

When introducing elements of the present invention or the preferred embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

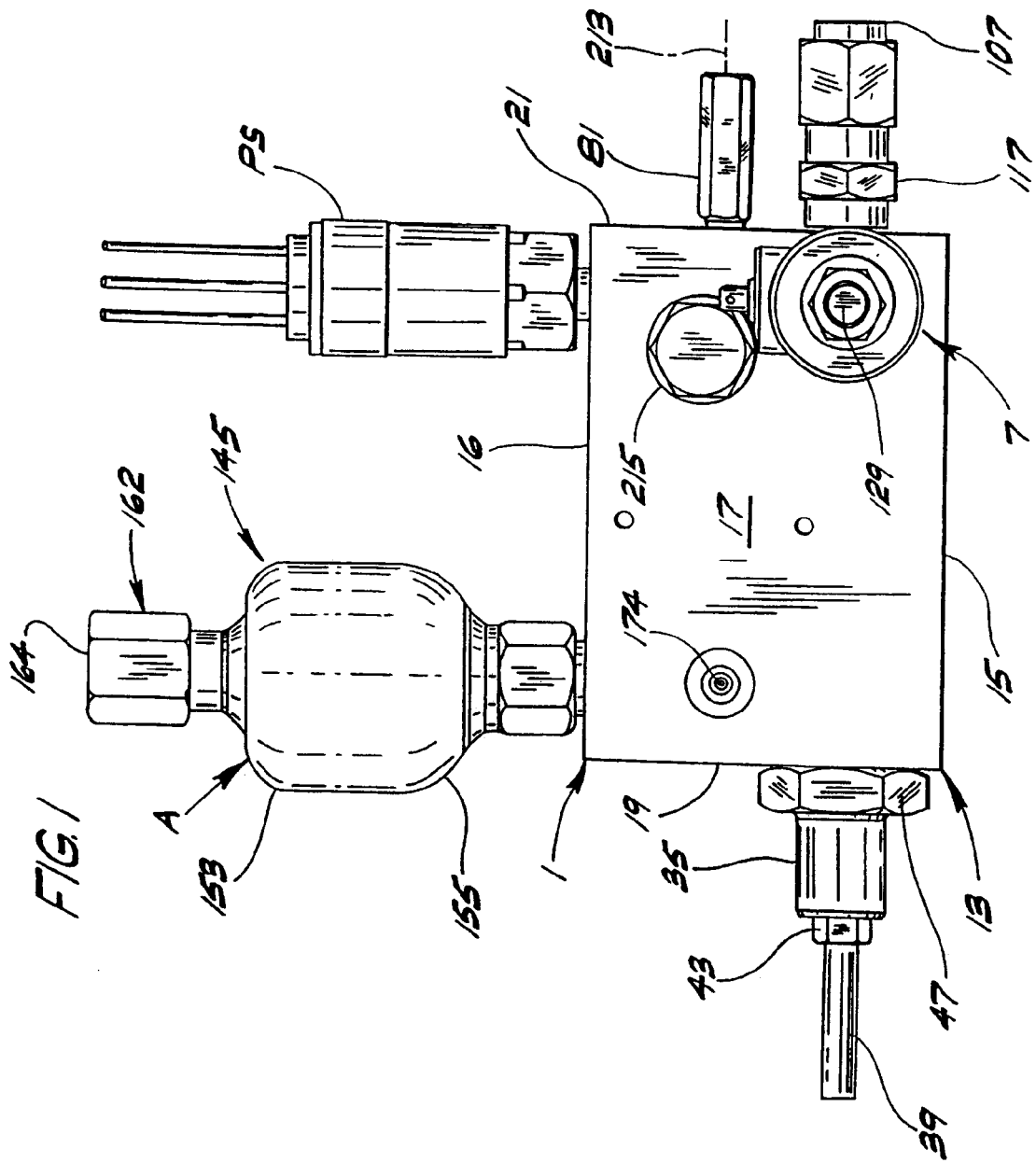

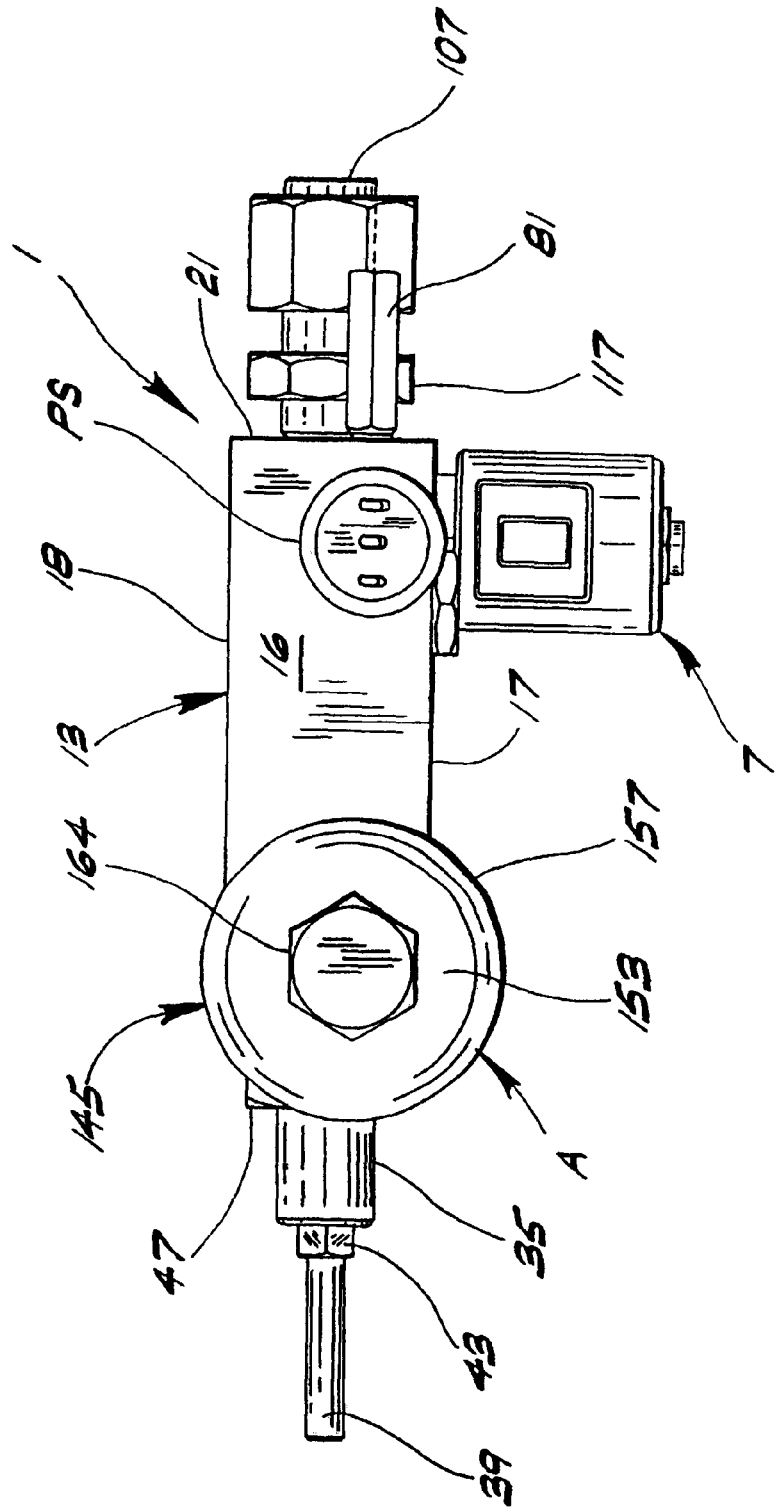

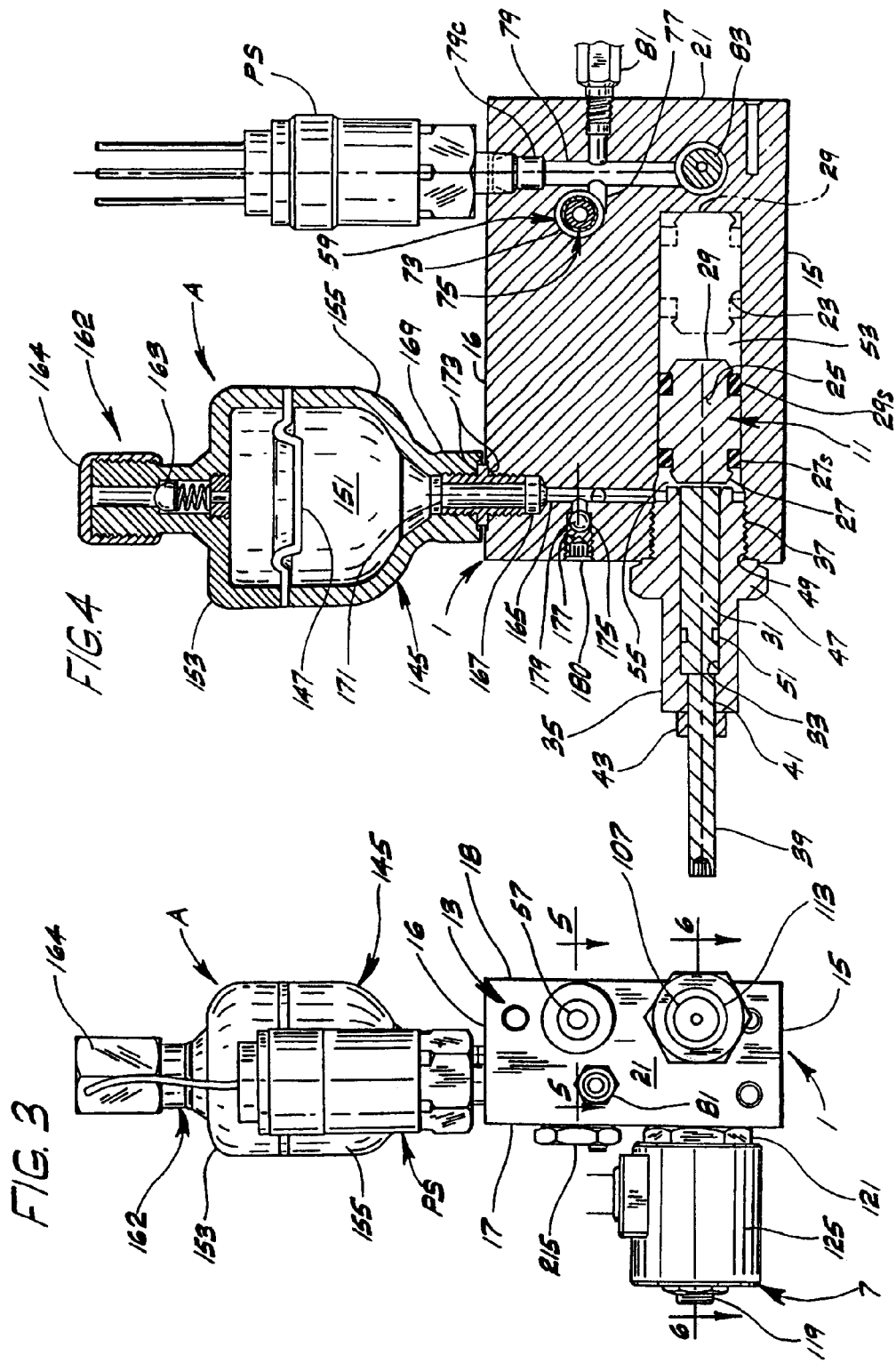

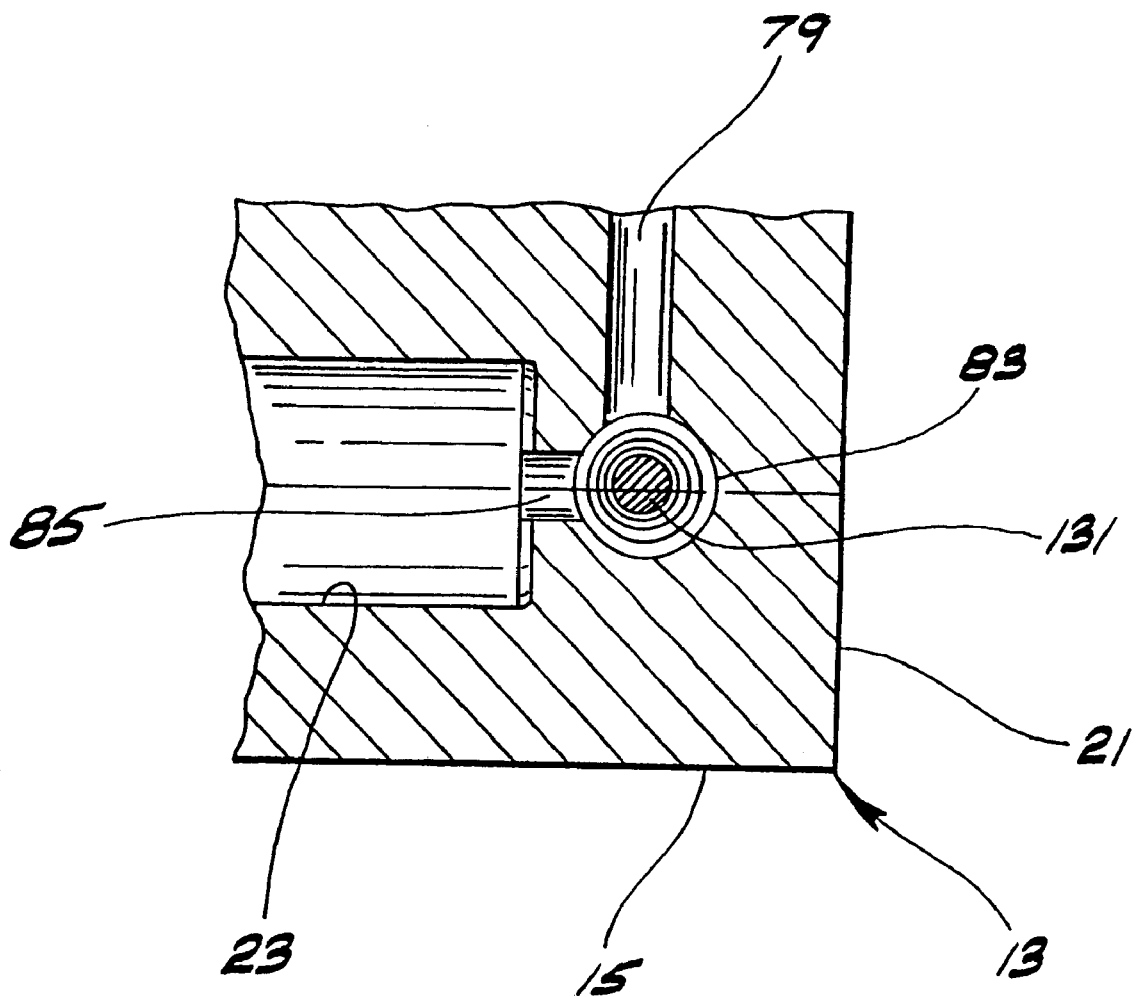

What is claimed is:

1. Fluid dispensing apparatus comprising an expansible chamber device having a member movable therein between a rearward retracted position and a forward position, said movable member having a rearward side and a forward side, said device with said movable member therein defining on the forward side of said member an expansible and contractible chamber adapted by movement of the member to its rearward retracted position to be charged with fluid to be dispensed;

said device being adapted for connection thereof in a system for the supplying of fluid under pressure to said chamber, the pressurized fluid supplied to the chamber being operable to move said member to its said retracted rearward position thereby to expand and load said chamber;

a system for ejection of fluid on forward movement of said movable member including a discharge valve adapted to be closed for charging said chamber with fluid and to be opened for ejection of fluid by forward movement of said movable member;

and an energy accumulator for accumulating energy for moving said member forward through a delivery stroke, said accumulator being accumulative of said member-actuable energy in response to the supplying of fluid under pressure to said chamber; a second expansible and contractible chamber on the rearward side of said movable member, said accumulator comprising a hollow body having a movable separator therein separating the space therein into an expansible and contractible gas chamber on one side of said movable separator and an expansible and contractible hydraulic fluid chamber on the other side of said movable separator, said gas chamber being charged with gas under pressure, said hydraulic fluid chamber being in communication with said second chamber via hydraulic fluid passaging in said body, and said hydraulic fluid chamber, said hydraulic fluid passaging and said second chamber being charged with hydraulic fluid, said hydraulic fluid being pressurized on rearward movement of said movable member to its retracted position thereby to move said separator further to pressurize the gas in said gas chamber, the further pressurized gas providing energy for application through the hydraulic fluid to move the said movable member forward through a delivery stroke.

2. Fluid dispensing apparatus as set forth in claim 1 wherein said separator is a flexible diaphragm.

3. Lubricant dispensing apparatus comprising a body having a cylinder therein, the cylinder having a rearward end and a forward end, and a piston reciprocable in the cylinder between a retracted rearward position and a forward position, said piston dividing the space in the cylinder into a forward expansible and contractible chamber and a rearward expansible and contractible chamber, said body being adapted for connection thereof in a system for supplying lubricant under pressure to said forward chamber, the pressurized lubricant supplied to said forward chamber being operable to drive the piston rearward to its retracted position and to fill said forward chamber, a system for the ejection of lubricant from said forward chamber to a point of lubrication on forward movement of the piston from its retracted position through a delivery stroke, said ejection system including a discharge valve adapted to be closed for charging said forward chamber with lubricant and to be opened for the ejection of lubricant from said forward chamber, and an energy accumulator for accumulating energy for driving the piston forward through a delivery stroke, said accumulator being accumulative of said piston-driving energy in response to the supplying of lubricant under pressure to said forward chamber and as a result of said rearward movement of said piston.

4. Lubricant dispensing apparatus as set forth in claim 3 wherein said discharge valve and said energy accumulator are mounted on said body.

5. Lubricant dispensing apparatus as set forth in claim 4 wherein said body has a discharge passage leading from the cylinder for discharge of fluid, said discharge valve being operable to close and open said discharge passage.

6. Lubricant dispensing apparatus as set forth in claim 3 wherein the retracted position of the piston is determined by engagement of the piston with a stop adjacent the rearward end of the cylinder, the piston being movable forward through a delivery stroke a limited distance from said stop.

7. Lubricant dispensing apparatus as set forth in claim 6 wherein the stop is adjustable lengthwise of the cylinder to different positions for adjusting the delivery stroke of the piston for selection of different volumes of lubricant to be ejected.

8. Lubricant dispensing apparatus as set forth in claim 3 wherein said accumulator comprises a hollow body having a movable separator therein separating the space therein into an expansible and contractible gas chamber on one side of said movable separator and an expansible and contractible hydraulic fluid chamber on the other side of said movable separator, said gas chamber being charged with gas under pressure, said hydraulic fluid chamber being in communication with said rearward expansible and contractible chamber of said cylinder via hydraulic fluid passaging in said body, and said hydraulic fluid chamber, said hydraulic fluid passaging and said rearward expansible and contractible chamber being charged with hydraulic fluid, said hydraulic fluid being pressurized on rearward movement of said piston to its retracted position thereby to move said separator further to pressurize the gas in said gas chamber, the further pressurized gas providing energy for application through the hydraulic fluid to move the piston forward through a delivery stroke.

9. Lubricant dispensing apparatus as set forth in claim 8 wherein said separator is a flexible diaphragm and the delivery stroke of the piston is adjustable for selection of different volumes of lubricant to be ejected.

10. Lubricant dispensing apparatus as set forth in claim 9 wherein the delivery stroke of the piston is adjustable by adjustment of the retracted position of the piston.

11. Lubricant dispensing apparatus as set forth in claim 3 further characterized in that the body is connected in a system having a pump for supplying lubricant under pressure to said forward chamber, the discharge valve is a solenoid valve, and there is a controller for controlling operation of the discharge valve and the pump.

12. Lubricant dispensing apparatus as set forth in claim 11 having a pressure switch responsive to pressure of lubricant in said cylinder interconnected with said controller, a manually operable switch for the controller to initiate a cycle of operation in which the discharge valve is opened with ensuing ejection of lubricant from the cylinder by the piston moving forward through a delivery stroke, the resultant drop in the pressure of lubricant in the cylinder opening the pressure switch and acting via the controller to close the discharge valve and initiate operation of the pump to recharge the cylinder, restoring pressure to close the pressure switch.

13. Lubricant dispensing apparatus as set forth in claim 3 wherein said body has an inlet for lubricant and passaging including an inlet check valve and a port at the forward end of the cylinder for delivery of lubricant from the inlet to the forward end of the cylinder.

14. Lubricant dispensing apparatus as set forth in claim 3 wherein said body has an outlet for lubricant and passaging including a port at the forward end of the cylinder for ejection of lubricant from the cylinder, said discharge valve comprising a solenoid valve having a valve seat and a valve member in said passaging.

15. Lubricant dispensing apparatus as set forth in claim 3 wherein said body has an inlet for lubricant and passaging including an inlet check valve and a port at the forward end of the cylinder for delivery of lubricant from the inlet to the forward end of the cylinder, said body further having an outlet for lubricant and passaging including said port for ejection of lubricant from the cylinder, said discharge valve comprising a solenoid valve having a valve seat and a valve member in the ejection passaging, and a lubricant line extending from said outlet to a spray nozzle for spraying the ejected volume of lubricant on an item to be lubricated.

16. Lubricant dispensing apparatus as set forth in claim 7 wherein the stop comprises a rod slidable generally axially with respect to the cylinder in a fitting at the rearward end of the cylinder, and an adjusting screw threaded in the fitting backing the rod.

* * * * *

UNITED STATES PATENT AND TRADEMARK OFFICE
CERTIFICATE OF CORRECTION

PATENT NO. : 6,286,627 B1
DATED : September 11, 2001
INVENTOR(S) : Grach et al.

It is certified that error appears in the above-identified patent and that said Letters Patent is hereby corrected as shown below:

Drawings,
Delete drawing sheets 7-9, consisting of Figs. 8-13 and substitute therefor the drawing sheets 1-6, consisting of Figs. 1-7, as shown on the attached page.

Signed and Sealed this

Thirteenth Day of August, 2002

Attest:

JAMES E. ROGAN
Attesting Officer        Director of the United States Patent and Trademark Office